Jan. 5, 1932.  V. HARMS  1,839,478
MAKING PHOSPHORIC ACID
Filed Nov. 24, 1930
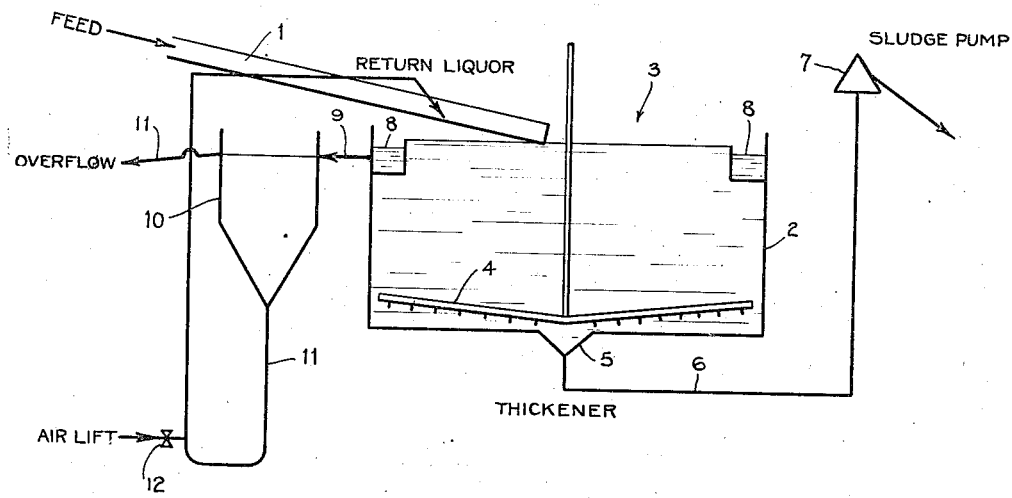
INVENTOR
Viggo Harms
BY
ATTORNEY Patented Jan. 5, 1932

1,839,478

UNITED STATES PATENT OFFICE

VIGGO HARMS, OF BERLIN, GERMANY, ASSIGNOR, BY MESNE ASSIGNMENTS, TO THE DORR COMPANY, INC., OF NEW YORK, N. Y., A CORPORATION OF DELAWARE

MAKING PHOSPHORIC ACID

Application filed November 24, 1930, Serial No. 497,781, and in Germany May 8, 1930.

This invention relates to control of sedimentation apparatus such as a thickener and more particularly to control whereby material in suspension in the pulp and having a lower settling rate than other suspension material in the pulp can be caused to pass out of the apparatus in the overflow therefrom.

Heretofore, in separating material in suspension in a liquid from the liquid by use of sedimentation apparatus, impurities in suspension in the pulp have frequently caused trouble by settling with the more valuable settled solids and have given rise to many difficulties in separating such impurities from the rest of said settled solids. For example, leaching phosphate rock with sulphuric acid or other mineral acid in the presence of alkali sulphates, such as potassium sulphate or ammonium sulphate, results in the formation of a suspension of gypsum and organic matter in a phosphoric acid solution.

Although the phosphoric acid solution is the most important product of the above mentioned operation, the gypsum is a valuable byproduct. However, in separating the phosphoric acid solution and the gypsum in the ordinary manner in sedimentation apparatus, the organic matter settles with the gypsum and not only lowers the value of the gypsum but is very difficult to separate therefrom. When the gypsum or calcium sulphate is to be used for certain purposes, such as the fixation of nitrogen, it is of great importance that the calcium sulphate to be used for this purpose should be as free as possible from such organic matter for otherwise the resulting solution would not be clear and it would be necessary to clarify the solution before evaporation.

While separation of calcium sulphate from the phosphoric acid solution by solution by filtration does not permit any purification of the calcium sulphate, separation by countercurrent decantation, for instance in a series of Dorr thickeners, produce some effect but the separation is, however, decidedly imperfect.

An important object of the invention is to provide a method of removing such impurities or material to be removed, which method will avoid the aforesaid difficulties. Another important object of the invention is to provide apparatus for carrying out such method.

According to the present invention overflow from the thickener is returned thereto and circulated there through to such an extent that the thickener becomes overloaded with overflow without proportional increase of gypsum, for example. The result is that the organic material which has a settling rate very much lower than the gypsum is forced into the overflow while the thick sludge of gypsum underflow of final density material is practically free from organic matter.

Other objects and advantages will be apparent upon consideration of the following description and the accompanying drawing in which:

The figure is a diagrammatic view illustrating one form of apparatus for carrying out the present invention.

The objects of the invention may in general be attained by feeding pulp, containing in suspension solids of different settling rates, into settling apparatus such as a Dorr thickener in which the solids will gradually settle and from which the liquid at the upper surface of the body of liquid in the tank will overflow, ordinarily with some of the fines in suspension; and by returning part of the overflow to the feed launder to increase the quantity of liquid entering the tank of the settling apparatus so as to overload the overflow and force certain material of lower settling rate than the rest out with the overflow.

Referring to the drawing, 1 designates an inclined feed launder or chute through which the pulp to be treated is delivered to a tank 2 near the center thereof. This tank is part of a thickener 3 of the Dorr type and also includes a rotary rake structure 4 which serves various purposes including that of working the settled solids toward the conical bottom outlet 5 from which the sludge containing such settled solids and some liquid is withdrawn through a pipe or line 6 by means, such as a Dorr diaphragm pump 7, and discharged to any desired point.

The relatively clear liquid near the top of the tank 2 overflows into an annular discharge launder or trough 8 extending around the periphery of the tank at the normal liquid level, and from the trough 8 the overflow liquid passes through a conduit or pipe 9 to an overflow box 10. From this overflow box the liquid at the surface is withdrawn and delivered to any desired point through a conduit or pipe 11. Part of the fluid is, however, withdrawn from the bottom of the overflow box through a conduit or pipe 11 and by suitable means, such as an air lift 12, is returned to the feed launder 1.

In order to make clear the operation to the apparatus, such operation will be described in connection with the leaching of phosphate rock with sulphuric acid in the presence of an alkali sulphate. The pulp consisting of a suspension of gypsum and organic matter in phosphoric acid solution is supplied to the feed launder or chute 1 and delivered thereby to the central part of the thickener tank 2. The gypsum having a higher settling rate than the organic matter will collect at the bottom of the tank while the organic matter is held in suspension at a higher level. The sludge of gypsum is removed continuously from the bottom of the tank by means of the pump 7, and the surface liquid in the tank overflows into the annular launder 8 from which it passes into an overflow box 10.

Under normal conditions the greater part of the liquid suspension of organic matter will be below the overflow level. However, by increasing the supply of liquid to the thickener without increasing the supply of gypsum the overflow is overloaded and the organic matter is forced into the overflow. As illustrated in the drawing this result is obtained by withdrawing liquid from the overflow box 10 (which provides a body of liquid of suitable depth to allow for variations in the supply of liquid from the launder 8) and, by means of the air lift 12, returned to the feed launder. It will be evident that by varying the action of the air lift the degree of overload of the overflow from the thickener may be varied and close control of the separation effected. The phosphoric acid solution which is not returned to the feed launder 1 is discharged from the overflow box through the conduit 11.

It should be understood that various changes may be made in the method and in the construction and arrangement of parts of the apparatus without departing from the true spirit and scope of the invention.

Having thus described my invention, I claim:

1. The method of controlling the separation from each other of materials in the same fluid suspension and having different settling rates, which includes supplying the fluid to a tank of a settling apparatus and withdrawing fluid from the upper part of the body of fluid in the tank, and returning some of such withdrawn fluid to the tank with the supply fluid to overload the settling apparatus and cause the withdrawal from the upper part of the body of fluid of material of higher settling rate than would normally be withdrawn.

2. The method of controlling the separation of materials having different settling rates and contained in fluid suspension in pulp, which includes maintaining a column of pulp to permit materials in fluid suspension to separate in accordance with their settling rates, supplying fresh pulp to said column, overflowing the liquid at the upper part of said column, removing the settled solids from the bottom of said column, and returning to said column part of the overflow fluid with the fresh pulp to cause certain fluid suspensions then to pass off with the overflow.

3. The method of controlling the separation from each of materials in the same fluid suspension and having different settling rates, which includes supplying the fluid to a tank of a settling apparatus and withdrawing fluid from the upper part of the body of fluid in the tank, returning some of such withdrawn fluid to the tank with the supply fluid to overload the settling apparatus and cause the withdrawl from the upper part of the body of fluid of material of higher settling rate than would normally be withdrawn, and varying the amount of liquid returned to the tank.

4. In the manufacture of phosphoric acid which includes the production of pulp including phosphoric acid solution and liquid suspensions of gypsum and organic matter, the method of obtaining gypsum substantially free from organic matter which includes separating the phosphoric acid solution from the gypsum by sedimentation and decantation and returning to the decantation stage phosphoric acid solution thus separated in such quantity as to cause the removal of the organic matter in such pulp with the decanted phosphoric acid solution.

5. In the manufacture of phosphoric acid which includes the production of pulp including phosphoric acid solution and liquid suspensions of gypsum and organic matter, the method of obtaining gypsum substantially free from organic matter which includes separating the phosphoric acid solution from the gypsum by sedimentation and decantation and adding in the sedimentation and decantation stage liquid free from gypsum and in such quantity as to cause the removal of the organic matter with the decanted phosphoric acid solution.

6. The combination with sedimentation apparatus including a tank to permit the settling of material in fluid suspension in pulp and from which settled solids are removed at the bottom and relatively clear liquid is removed substantially at the surface of the liquid in said tank, and means to feed fresh pulp to said tank; of means to return some of such removed fluid to the upper part of said tank.

7. The combination with sedimentation apparatus including a settling tank from the lower part of which settled solids are removed and from which liquid overflows at substantially the normal liquid level therein, a feed launder to supply pulp to said tank, and an overflow receptacle to receive such overflow, and from the normal liquid level portion of which liquid is withdrawn; of means for returning liquid from the lower part of the overflow receptacle to the feed launder in such quantity as to overload said tank and cause the removal in the overflow of fluid suspension material normally beneath the overflow level.

In testimony whereof I affix my signature.

VIGGO HARMS.